Aug. 22, 1950     C. H. O. BERG     2,519,343
ADSORPTION PROCESS AND APPARATUS Filed May 3, 1946

INVENTOR
*CLYDE H. O. BERG,*
BY
*Ross J. Garofalo*
ATTORNEY

Patented Aug. 22, 1950

2,519,343

UNITED STATES PATENT OFFICE 2,519,343

ADSORPTION PROCESS AND APPARATUS

Clyde H. O. Berg, Long Beach, Calif., assignor to Union Oil Company of California, Los Angeles, Calif., a corporation of California Application May 3, 1946, Serial No. 667,006

26 Claims. (Cl. 62—122)

This invention relates to the separation of gaseous mixtures by selective adsorption of certain of the components of such mixtures on a solid adsorbent and applies particularly to the separation of normally gaseous hydrocarbons by selective adsorption on granular charcoal. This is a continuation-in-part of application Ser. No. 618,346, filed September 24, 1945.

The separation of gaseous mixtures into constituent components may be accomplished by fractional distillation, solvent extraction, selective adsorption, and similar processes. In so separating gaseous mixtures in which the gaseous components possess low critical temperatures the operational difficulties encountered in liquefaction thereof render such processes as distillation, liquid-liquid extraction, and the like, economically impracticable. It has been found that such gaseous mixtures may be conveniently separated by the process of selective adsorption on a solid granular adsorbent as more clearly illustrated hereinafter. Among the petroleum hydrocarbons those compounds of lower molecular weight generally exhibit the lowest critical temperatures and it is these normally gaseous hydrocarbons that are most generally separated by such adsorption process. For example, in a mixture of hydrocarbons of the aliphatic series ranging from methane through ethane, ethylene, propane, propylene, butane, butylene, and even pentanes, separation of such a mixture into its individual constituents is rendered difficult by means of fractional distillation due to exceedingly low temperatures and high pressures necessary to liquefy these gases.

Gaseous mixtures containing valuable hydrocarbons are encountered in large amounts in many processes, such as for example, thermal or catalytic cracking of hydrocarbon fractions for the production of high grade material fuel, or the like. In such processes, a hydrocarbon feed stock such as gas oil, or the like, is cracked by subjection to extremely high temperatures or by contacting with a catalyst at more moderate temperatures. Upon cooling the resultant product to atmospheric temperature, and separating the liquid condensate, a gaseous mixture is obtained which contains predominantly normally gaseous hydrocarbons together with some normally liquid hydrocarbons. It is generally uneconomical to carry out operations at sufficiently high pressures or sufficiently low temperatures to recover, by distillation, or the like, any substantial proportion of the valuable $C_2$ and $C_3$ hydrocarbons contents in such a gaseous mixture. Consequently, these hydrocarbons, which may contain a high proportion of potentially valuable olefins such as ethylene, propylene, acetylene, and the like, are either wasted or employed as low-value fuel gas. The present process is applicable to the separation of any normally gaseous mixtures and particularly gaseous mixtures of hydrocarbons containing five carbon atoms or less.

It is known that certain solid adsorbents such as for example activated charcoal or silica gel will adsorb some gases such as water vapor, benzene vapor, butane, and the like, more readily than they will other gases, such as hydrogen, nitrogen, methane, and the like, and that by heating the enriched adsorbent containing the adsorbed gases these gases may be liberated substantially completely and the adsorbents after being cooled again are capable of further selective adsorption. This has lead to the development of various processes for separation of gases involving adsorption on solid adsorbents, heating the enriched adsorbents to liberate the adsorbed gases and cooling the thus regenerated adsorbent for further use. The present invention involves a process of this type which constitutes an improvement over any previous process described in that it affords greater efficiency of separation as well as greater simplicity of operation.

In general, the process of separating gaseous mixtures by selective adsorption on granular charcoal involves the steps of countercurrently adsorbing certain components of the gaseous mixture in a charcoal bed, preferably in a moving bed of charcoal. In a moving bed operation the charcoal, upon which certain of the gaseous components have been adsorbed, flows from the adsorption zone through one or more rectification zones, as hereinafter described, and into a stripping section wherein the adsorbed components are desorbed from the charcoal by means of heat with the aid of a stripping gas such as, for example, steam. The stripped charcoal is subsequently cooled prior to repassage through the adsorption section. In a stationary bed operation the same series of cycles would of necessity be performed, and the same factors would be taken into consideration.

The degree of adsorbability of gases on charcoal or other adsorbents which possess the same properties as charcoal, is generally higher for gases of higher molecular weight. This is found to be particularly true with regard to the hydrocarbon series. Among the non-hydrocarbon gases there appears to be a correlation between adsorbability and critical temperature. Thus, gases of low critical temperature such as hydrogen, nitrogen, oxygen, and carbon monoxide are adsorbed to a lesser degree than gases of comparatively higher critical temperature such as chlorine, sulfur dioxide, hydrogen sulfide, ammonia, nitrous oxide, carbon dioxide, and the like, and separation between these components may be accomplished by selective adsorption according to the principles of the present invention. Similarly, the process of selective adsorption may be employed for the separation of hydrocarbon vapors of higher molecular weight from those of lower molecular weight such as, for example, the separation of ethylene from methane, or the like, as well as for the separation of non-hydrocarbon gases of high critical temperature from those of lower critical temperature.

For example, in the conventional process of selective adsorption, a gaseous fraction such as a hydrocarbon fraction is divided into two separate fractions, one enriched in higher molecular weight components and the other enriched in the lower molecular weight components, the former being obtained as the adsorbate from the stripping section and the latter, passing through the adsorption section, being preferentially desorbed by the higher molecular weight components.

In a recent improvement in the art of selective adsorption and separation of gases an adsorption column has been provided which contains two or more rectification sections whereby it is possible through the utilization of a refluxing step within these rectification sections not only to separate a lean gas, i. e., a fraction rich in hydrocarbons of lower molecular weight, and a make gas, i. e., a fraction rich in hydrocarbons of higher molecular weight, but also one or more heart cuts, i. e., fractions of relatively narrow boiling range and of intermediate molecular weight separated from the wider boiling range hydrocarbon fraction. In the resolution of a normally gaseous hydrocarbon fraction containing, for example, methane, butane and any or all of the aliphatic hydrocarbons intermediate between methane and butane in a conventional selective adsorptive process, it is possible to resolve two components; one enriched in the higher molecular weight hydrocarbons and the other enriched in the lower molecular weight hydrocarbons, the dividing point between the two fractions being a function of such variable factors as the ratio of charcoal to the feed stock, the charcoal flow rate, and the like. In the more recent improved process herein called "the heart cutting process," the heavier components such as the $C_2$, $C_3$ and $C_4$ hydrocarbons are adsorbed by the granular adsorbent in the adsorption section of the column. The adsorbent is thereafter passed through a number of rectification sections wherein it is subjected progressively to a reflux of $C_2$, $C_3$ and $C_4$ hydrocarbons, which reflux in the first instance has the effect of insuring a minimum retention of methane on the adsorbent passing from the initial rectification section to the secondary rectification section. In the second rectification section the adsorbent is subjected to a reflux of $C_3$ and $C_4$ hydrocarbons whereby the $C_2$ hydrocarbons are effectively desorbed from the adsorbent and may be removed from the column by appropriate means as a heart cut from the wider range feed stock. Additional rectification sections may be employed in which a progressively higher molecular weight reflux is used whereby further heart cuts of hydrocarbons of higher molecular weight than the $C_2$ hydrocarbons may be obtained. However, for the purpose of clarity the description to follow will be with reference to an adsorption process and apparatus in which there are only two rectification sections employed; one to insure the desorption of any residual amounts of methane desorbed on the adsorbent within the adsorption section, and the second to effect the desorption of the heart cut that it is desired to recover.

There are certain limitations inherent in this improved selective adsorption process which it is the purpose of this invention to correct. It is evident from the above description that a side cut or heart cut fraction of $C_2$ hydrocarbons would contain both ethylene and ethane, and that this fraction would not only be a mixture of ethylene and ethane but would also contain small amounts of higher and lower molecular weight hydrocarbons as impurities. Further, in a process as above described it is inevitable that a certain proportion of the desired heart cut fraction will be lost in the lean gas recovered from the adsorption section and in the make gas recovered from the stripping section.

It is an object of the present invention, therefore, to provide an improved process and apparatus for the separation of gaseous mixture by selective adsorption.

It is a further object of the invention to improve the efficiency of the adsorption process whereby higher recoveries of an individual component of the gaseous mixture will be realized while at the same time there may be obtained from the gaseous mixture specific fractions of an exceptionally high degree of purity.

Another disadvantage of the present selective adsorption process is the deleterious effect on the adsorbent of small amounts of normally liquid hydrocarbons or of higher molecular weight gaseous hydrocarbons and particularly those of unsaturated nature. The presence of these contaminants makes necessary the usage of unduly high temperatures in the stripping section which in turn has the effect of tending to polymerize these heavier components to form harmful deposits within the adsorbent. It therefore becomes periodically necessary to reactivate the adsorbent by exceedingly high temperature steam activation, or the like. It has been found that the higher the molecular weight of the components on the adsorbent as it passes into the stripping section the higher stripping temperatures are required in order to restore to the charcoal substantially its original adsorptive capacity.

It is therefore a further object of my invention to provide a process for the separation of gaseous mixtures by the utilization of selective adsorption wherein undesirable components of the gaseous mixture may be previously removed while at the same time there is substantially no loss of the more desirable components.

Other objects and advantages of my invention will become apparent to those skilled in the art as the description thereof proceeds.

The above contemplated objects are accomplished according to my invention by combining with selective adsorption process certain preliminary absorption steps and certain subsequent distillation steps all joined in an integrated unit wherein a normally gaseous mixture may be segregated into a number of comparatively pure fractions while at the same time realizing a high recovery of each.

In the improved selective adsorption process, such as that described above, a gaseous mixture such as a hydrocarbon fraction containing $C_1$ through $C_4$ or higher hydrocarbons is fed directly into the adsorption section of a column such as that more fully described hereinafter. In this adsorption section substantially all of the $C_2$ and heavier hydrocarbons are adsorbed on the adsorbent which for purposes of description may be considered to be activated charcoal, while substantially all of the $C_1$ hydrocarbon together with any other gaseous impurities pass through the adsorption section of the column. The charcoal passing from the adsorption section into a primary rectification section is contacted therein with additional quantities of $C_2$ hydrocarbons which are liberated from the charcoal at a point further down in the column and which have the effect of insuring the desorption of any methane which may have been contained on the charcoal passing from the adsorption section into the rectification section. The desorbed methane migrates thereafter from the rectification section back through the adsorption section. The substantially methane free adsorbent is then passed into a rectification section wherein it is contacted with additional quantities of $C_3$ and $C_4$ hydrocarbons which $C_3$ and $C_4$ hydrocarbon reflux has the effect of desorbing the $C_2$ hydrocarbons contained in the charcoal. A portion of the desorbed $C_2$ hydrocarbons are caused to flow back into the initial rectification section as above described wherein they are again adsorbed by the charcoal, and another portion of the adsorbed $C_2$ hydrocarbon is withdrawn from the secondary rectification section as a heart cut fraction. The adsorbent containing substantially only $C_3$ and $C_4$ hydrocarbons is subsequently passed through a stripping section where these higher molecular weight hydrocarbons are stripped from the adsorbent and may be removed from the adsorption column. A portion of this higher molecular weight fraction herein termed "make gas" may be caused to flow from the stripping section back into the secondary rectification section as indicated above or may alternatively be reintroduced into the secondary rectification section after the removal of the stripping steam therefrom. In an operation such as that described from a feed containing approximately 34.9% methane, 40% ethylene, 8.2% ethane, and 14.5% propane, propylene and heavier hydrocarbons, there may be obtained a heart cut containing approximately 1.3% methane, 76.1% ethylene, 13.7% ethane, and 5.8% propane, propylene and heavier hydrocarbons. In addition to the fact that this heart cut is contaminated with appreciable percentage of methane and propane-propylene, it is found that the lead gas passing through the adsorption section will contain as high as 1½% ethylene while the make gas recovered from the stripping section will contain as high as 4.3% ethylene and 1.1% ethane.

In the process of the present invention the same hydrocarbon mixture may be separated into fractions of considerably greater purity without the loss of the desired components in other fractions.

This improved separation is made possible by combining with a selective absorption column an initial oil adsorption unit, wherein substantially all of the $C_4$ and heavier hydrocarbons are removed from the feed, and subsequent distillation units wherein the fractions obtained are further purified and which are so connected to the adsorption column that substantially none of the residual amounts of the desired components are lost in impure fractions.

The process and apparatus of my invention may be more fully understood by reference to the accompanying drawing wherein there is shown a diagrammatic view of a separation unit according to the principles of the present disclosure.

Figure 1:
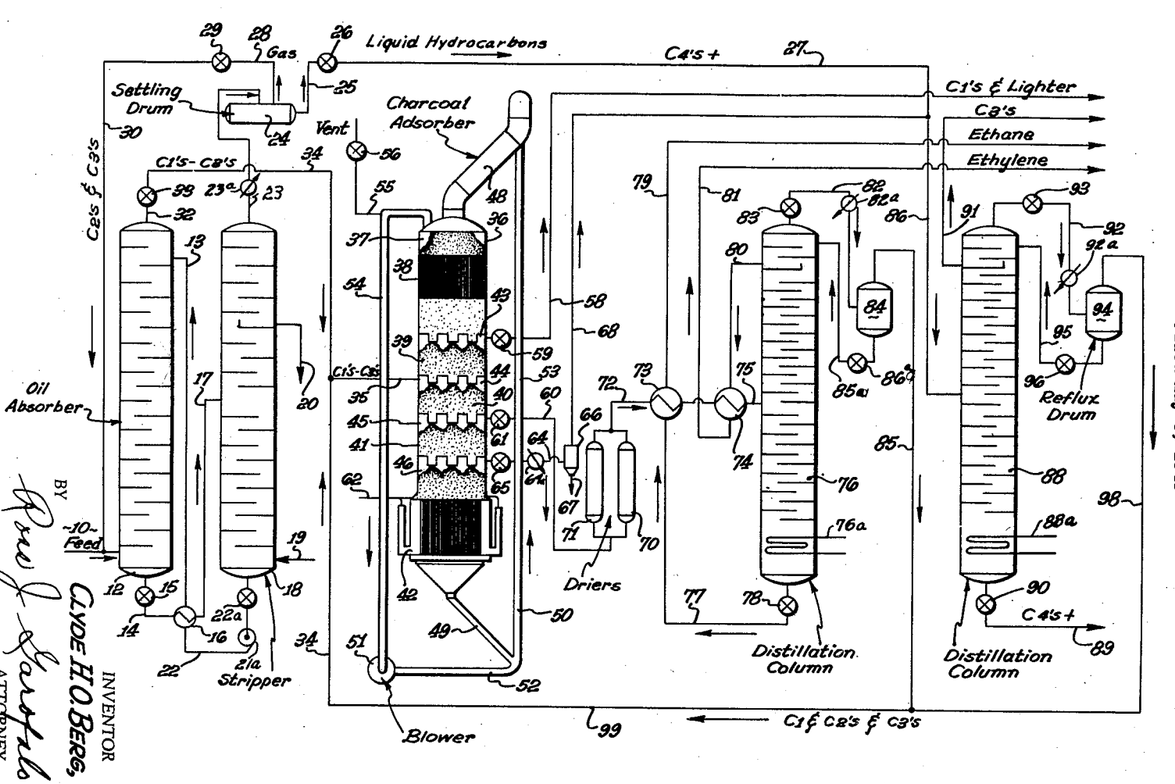

Referring to the drawing, the hydrocarbon mixture which may be considered to comprise $C_1$, $C_2$, $C_3$, and $C_4$ hydrocarbons with possibly higher molecular weight hydrocarbon impurities is passed into the system through feed line 10 entering into the oil absorber 12. Absorption oil is introduced to the absorber 12 by means of line 13 passing therein countercurrently to the hydrocarbon feed and absorbing from the feed substantially all of the $C_4$ and heavier hydrocarbons. The absorption oil containing the heavier hydrocarbons together with small amounts of the lower molecular weight hydrocarbons is withdrawn from absorber 12 by means of line 14 controlled by valve 15 and is passed through heat exchanger 16 and introduced through line 17 to stripper 18. Steam is introduced to stripper 18 by means of line 19 and water is withdrawn therefrom by means of line 20. The stripped oil is withdrawn from the stripper 18 by means of pump 21a and line 22 controlled by valve 22a and is interchanged with the rich absorption oil in interchanger 16, as previously described, passing therefrom through line 13 back to absorber 12. The stripped hydrocarbons are removed from the stripper 18 by means of line 23 and are introduced into a settling drum 24 wherein the hydrocarbons which liquefy at the pressure of operation are separated from those which remain in the gaseous state. The liquefied hydrocarbons comprising predominantly $C_4$ and heavier hydrocarbons are withdrawn from settling drum 24 by means of line 25 controlled by valve 26 and passed through line 27 to a distillation column as hereinafter described. The hydrocarbons which remain in the gaseous state, predominantly $C_2$ and $C_3$ hydrocarbons, are removed from the settling drum 24 by means of line 28 controlled by valve 29 and pass through line 30 joining the feed in line 10 and are thereby reintroduced to the oil absorber 12.

Those hydrocarbons passing unabsorbed through the absorber, i. e. the dry gas, are withdrawn therefrom by means of line 32 controlled by valve 33 and pass through line 34 into line 35, passing therefrom into the charcoal adsorber 36.

The adsorption column as shown comprises a charcoal hopper 37, a cooling section 38, an adsorption section 39, a primary ractification section 40, a secondary ractification section 41 and a stripping section 42. Disengagers 43, 44, 45 and 46 separate these sections from each other and provide means whereby gases may be introduced into or withdrawn from the adsorption column. These disengagers may be of the type indicated in the drawing, in which a horizontal tray extending over the entire cross-sectional area of the column is equipped with a number of vertical open tubes through which the solid may flow. These tubes depend from the tray a distance sufficient to provide a continuous open gas space above the solid in the section below, from which gas space extend the lines through which gas is fed to or withdrawn from the column. Charcoal flowing from the charcoal gas separator 48 passes successively through the hopper, the cooler, the adsorption section, the two rectification sections, and the stripping section, and flows from the bottom of the column 36 into transfer line 49 from whence it is deposited into the conveyance system 50.

Conveyance system 50, as herein shown, comprises a gas lift system which includes a blower 51 to energize the lift gas which is forced through line 52 and up line 53 after picking up the charcoal deposited at the lower end of line 53 from transfer line 49. The charcoal gas mixture is introduced to the charcoal gas separator 48 wherein the two are separated the charcoal falling into hopper 37 and the lift gas returning by means of line 54 to the blower 51. It may be desirable to operate the adsorption column in such a manner that a portion of the lean gas flows countercurrently to the charcoal through the cooler and the hopper and from thence into the upper portion of the return line 54. If such operation is employed a vent 55 controlled by valve 56 is desirable whereby an excessive build up of lift gas may be prevented.

The feed to the adsorption column, consisting predominantly of $C_1$, $C_2$ and $C_3$ hydrocarbons, is introduced by means of line 35 at disengager 44 and flows countercurrently to the charcoal into the adsorption section 39. In adsorption section 39 a partial equilibrium is reached wherein substantially all of the $C_2$ and $C_3$ hydrocarbons are adsorbed on the charcoal while substantially all of the methane passes through the adsorption section 39 and may be withdrawn, subject to the above mentioned exception, by means of line 58 controlled by valve 59.

The charcoal flowing from the adsorption section 39 through the disengager 44 into the rectification section 40, is substantially saturated with $C_2$ and $C_3$ hydrocarbons and may contain small amounts of methane. In this primary rectification section 40 the downwardly flowing charcoal is contacted with additional quantities of $C_2$ hydrocarbons whereby any residual methane adsorbed on the chorcoal is desorbed by virtue of the preferential adsorption of the $C_2$ hydrocarbon, and passes countercurrently to the charcoal back through disengager 44 into the adsoption section 39. The substantially methane free charcoal flows from the rectification section 40 through disengager 45 into the secondary rectification section 41.

In the secondary rectification section 41 the charcoal is contacted with additional quantities of $C_3$ hydrocarbons sufficient to desorb substantially all of the $C_2$ hydrocarbons contained in the charcoal. These desorbed $C_2$ hydrocabrons migrate countercurrently to the charcoal and may be withdrawn at disengager 45 by means of line 60 controlled by valve 61. The entire quantity of desorbed $C_2$ hydrocarbons is not withdrawn, however, from the column, a part being forced to pass countercurrently to the charcoal through the disengager 45 back into the primary rectification section 40 to effect the desorption of a small amount of methane which may be on the charcoal as above described.

The charcoal, from which substantially all of the $C_2$ hydrocarbons have been desorbed, passes from the secondary rectification section 41 through the disengager 46 into stripping section 42. Steam is introduced to the stripping section 42 by means of line 62 and removes the adsorbed hydrocarbons from the charcoal therein. A major proportion of the stripping steam and stripped hydrocarbons is removed from the adsorption column at disengager 46 by means of line 64 controlled by valve 65 passing therefrom into a condenser or phase separator 66 from which the condensate is removed by line 67 and the gaseous hydrocarbons are removed by line 68. A portion of the stripped hydrocarbons are forced to pass countercurrently to the charcoal through the disengager 46 into rectification section 41 to effect the desorption of the $C_2$ hydrocarbons as described. As previously described the stripped charcoal flows from the bottom of the column 36 through transfer line 49 and into the lift line 53 to be returned to the top of the column.

The $C_2$ heart cut withdrawn from the column at disengager 45 by means of line 60 is passed through a drier 70 or 71 which may be connected in parallel, as shown, to permit alternate drying and reactivation cycles. From the drier the $C_2$ heart cut passes through line 72, interchanger 73, interchanger 74, and line 75 into a primary distillation column 76.

In the distillation column 76 separation is effected between the ethane and ethylene and any lighter hydrocarbons which may be present as impurities. The ethane is withdrawn from the bottom of column 76 by means of line 77 controlled by valve 78 is interchanged with the feed to the column in interchanger 73 and passes through line 79 to storage, or the like. The substantially pure ethylene is obtained as a side cut from the column at a point comparatively near the top thereof being withdrawn therefrom by means of line 80. The ethylene passes through interchanger 74 and line 81 to storage. The vapor overhead from the distillation column 76 comprising a mixture of methane and ethylene is withdrawn from the column by means of line 82 controlled by valve 83 and passes into a reflux drum 84. In the reflux drum 84 a vapor phase and a liquid phase separate from each other the latter being passed through line 85a controlled by valve 86a back to the distillation column 76 to serve as reflux therein. The vapor phase comprising methane and unliquefied ethylene is withdrawn from the top of reflux drum 84 by means of line 85 and is returned therein to line 35 whereby it is returned to the adsorption column. In this manner a very pure ethylene fraction may be obtained without sacrifice of ethylene inasmuch as that lost in the overhead from distillation column 76 is returned to the adsorption column 36 to increase the ethylene content of the feed thereof.

The stripped hydrocarbon fraction, also termed "make gas," comprising predominantly $C_3$ hydrocarbons together with some $C_2$ hydrocarbons withdrawn from the condenser 66 passes through line 68 into line 86 into which the $C_4$ and heavier hydrocarbons obtained from the settling drum 24 are also discharged by means of line 27. The $C_3$ and $C_4$ hydrocarbons containing small amounts of $C_2$ hydrocarbons as impurities are introduced into a secondary distillation column 88. In distillation column 88 a separation is effected between the $C_4$'s and the $C_3$'s and the $C_2$ impurities. The $C_4$ and any heavier hydrocarbons which may have been present in the feed are withdrawn from distillation column 88 by means of line 89 controlled by valve 90. Substantially pure $C_3$ hydrocarbons are withdrawn as a side cut from the distillation column 88 by means of line 91 and are passed therein to storage, or the like. The vapor overhead from column 88 comprising a mixture of $C_3$ and $C_2$ hydrocarbons is passed through line 92 controlled by valve 93 into reflux drum 94. Here again a liquid vapor separation takes place, the liquid fraction being withdrawn from the reflux drum 94 by means of line 95 controlled by valve 96 and reintroduced as reflux into column 88. A vaporous fraction comprising $C_2$'s and uncondensed $C_3$ hydrocarbons is withdrawn from the reflux drum 94 by means of line 98 and is combined in line 99 with the vaporous fraction from the primary distillation and is returned therewith to the adsorption column by means of line 35. Coolers 23a, 64a, 82a and 92a are shown in lines 23, 64, 82 and 92 respectively to provide the respective condensates described, in accordance with conventional procedure. Also reboilers 76a and 88a are shown in distillation columns 76 and 88 respectively in accordance with conventional distillation procedure.

From the above description of the process relative to the accompanying drawing it is apparent that I have provided means whereby a gaseous mixture may be separated into numerous components of a high degree of purity without sacrifice of the desirable high yields. This improved separation is accomplished by means of the cooperative functioning of an oil absorption unit, a charcoal adsorption unit and dual distillation units. The effective utilization of these units in a series operation such as that described depends for its effectiveness upon comparatively intricate recycling operations which have the effect of preventing the loss of individual components of the mixture as contaminants in other component fractions. The oil absorption step cooperates with the charcoal adsorption step by removing from the feed gas to the charcoal adsorption step the more difficultly handled heavier hydrocarbons. Thus, by removing substantially all of the $C_4$ and heavier hydrocarbons from the feed to the charcoal adsorption unit improved separation results in the unit and, of even more importance, the effective life of the charcoal is materially increased as a result of the usage of lower stripping temperatures with consequent decrease in polymer formation within the charcoal. This removal of the higher molecular weight hydrocarbons is effected without loss of the lower molecular weight components for any of such latter components present in the higher molecular weight fraction are separated therefrom in the secondary distillation column and are returned to the feed to the adsorption unit.

The distillation steps cooperate with the charcoal adsorption step in further purifying the fractions obtained from the charcoal adsorber. This purification is accomplished by three fraction distillation whereby residual amounts of a particular fraction passing into another fraction as an impurity are not lost in the process but by suitable return to the charcoal adsorber are recovered and thereby regained in the desired fraction.

It is apparent that either of these adjuncts to the charcoal adsorption process may be utilized with the process to advantage, but it is preferable to utilize both adjuncts in cooperation with the charcoal adsorption. Thus, I may employ a process in which the oil adsorbers are employed in cooperation with charcoal absorber in order to effect a longer charcoal life or I may employ a process in which the distillation units are used in cooperation with charcoal adsorber to obtain fractions of higher purity and to prevent loss of desirable components as impurities of other fractions. However, I prefer to employ a process in which both the oil absorption steps and the distillation steps are used in conjunction with the charcoal adsorber for in so doing the advantages of both may be combined to give a process of superior merit.

The charcoal employed in the above process is preferably granular, about 10 to 14 mesh, although sizes as large as about 4 mesh and as small as about 100 mesh may also be employed. By "charcoal" herein is meant any carbon, animal or vegetable charcoal, or the like, although an activated form of carbon or charcoal is preferred. After continued usage, small amounts of highly adsorbable materials may accumulate in the charcoal and impair its efficiency somewhat. The charcoal may then be withdrawn form the hopper and may be reactivated by high temperature steam treatment. The effective life of the charcoal, before this reactivation becomes necessary, is a function of the composition of the gaseous mixture to be separated as above illustrated.

The process of this invention may be employed for the separation of any mixture of gases, containing two or more components one of which is more readily adsorbable on the adsorbent than the other, into fractions, the fraction richer in the more readily adsorbable component being termed the "make gas," and the fraction in the less readily adsorbable component being termed the "lean gas." Further, if the feed gas comprises three or more components an intermediate fraction or "heart cut" may be obtained, or if desired more than one intermediate fraction may be obtained as above described and subsequently distilled in the manner indicated to recover substantially pure components. In such event a vapor overhead would be obtained from the fractionation of each of the heart cuts which vapor overheads would be combined and recycled to the charcoal adsorption unit.

There are many modifications of the above process which may be employed. Although granular charcoal of about 10 to 40 mesh is preferred, larger granules up to about 2 mesh may be employed in some instances, and finely ground or powdered charcoal of particle size as small as about 500 mesh may also be employed. When using the powdered charcoal, however, care must be exercised in the design of sealing legs, separators, etc. The use of finely powdered charcoal lends itself well to concurrent flow of stripping gas and charcoal, which is another modification applicable also to granular charcoal. When concurrent flow of stripping gas and charcoal is employed, particularly with finely ground charcoal, the stripping may be accomplished by lifting the charcoal to a separator located at the top of a cooler while heating it at the same time. In another modification, the stripping gas may be sufficiently preheated to supply the bulk or all of the necessary stripping heat.

It is to be understood that the selective adsorption process as herein set forth is not limited in its scope to the particular gaseous mixtures employed in the description and illustration. Thus, in the first case I may employ this adsorption process for the separation of any normally gaseous materials into two or more fractions each of which are enriched in certain components of the gaseous mixture. I have found, as herein before set forth that charcoal or similar adsorbents exhibit a preferential adsorption for the gases of lower critical temperature which relationship amongst the gases of the hydrocarbon series appears to be more clearly related to the molecular weight thereof. It is, therefore, within the scope of the invention to separate any gases of differing critical temperature or any hydrocarbon gases of differing molecular weight. I have found that the selective adsorption process herein defined is particularly effective for the separation of an ethylene rich fraction from a mixture of low molecular weight hydrocarbon gases. Thus, from a gaseous mixture comprising methane, ethane, ethylene, propane, propylene, which mixture may or may not contain higher molecular weight hydrocarbon or gaseous impurities such as hydrogen, carbon dioxide, or the like, an ethylene rich heart cut may be obtained in an operation substantially similar to that described with reference to the drawing.

Having described and illustrated my invention and realizing that many modifications thereof will occur to those skilled in the art without departing from the spirit or scope of the foregoing specification or of the following claims, I claim:

1. A process for separating a normally gaseous mixture containing gases of different critical temperatures into fractions differing from each other by the critical temperature thereof, which comprises separating a first fraction comprising gases of higher critical temperature by contacting said gaseous mixture with an absorption oil whereby said first fraction is absorbed by said oil, withdrawing the unabsorbed components of said gaseous mixture from said absorption oil, stripping said first fraction from said absorption oil, further separating said unabsorbed components of said gaseous mixture in an adsorption operation wherein said gases are contacted with a moving stream of granular adsorbent, removing a second fraction of said gaseous mixture comprising the gases of lowest critical temperature from said adsorption operation as substantially unadsorbed gases, contacting the resulting adsorbent with a portion of a third fraction of said gaseous mixture comprising gases of intermediate critical temperature and thereby desorbing any residual adsorbed second fraction, contacting the resulting adsorbent with a portion of a fourth fraction and thereby adsorbing said portion of said fourth fraction and desorbing said third fraction, employing a portion of said third fraction to desorb said residual second fraction as above, stripping said adsorbent to recover therefrom said fourth fraction comprising gases of higher critical temperature than said third fraction, combining the remainder of said fourth fraction with said first fraction, fractionating said combined fractions to obtain a fifth fraction as bottoms from said fractionation comprising gases of highest critical temperature, a sixth fraction as a liquid comprising gases of somewhat lower critical temperature than said fifth fraction, and a seventh fraction as a vapor, condensing a portion of said seventh fraction, returning said condensed portion to said fractionation to serve as reflux therein, and recycling the uncondensed portion of said seventh fraction to the said adsorption operation, fractionating the remainder of said third fraction to obtain an eighth fraction as bottoms rich in gases of somewhat lower critical temperature than said sixth fraction, a ninth fraction as a liquid rich in gases of somewhat lower critical temperature than said eighth fraction, and a tenth fraction as a vapor, condensing a portion of said tenth fraction, returning said condensed portion to said last named fractionation to serve as reflux therein, and recycling the uncondensed portion of said tenth fraction to said adsorption operation.

2. A process for separating a normally gaseous mixture containing gases of differing critical temperatures into fractions differing from each other by the critical temperature thereof, which comprises separating a first fraction comprising gases of higher critical temperature by contacting said gaseous mixture with an absorption oil whereby said first fraction is absorbed by said oil, withdrawing the unabsorbed components of said gaseous mixture from said absorption oil, stripping said first fraction from said absorption oil, further separating said unabsorbed components of said gaseous mixture in an adsorption operation wherein said gases are contacted with a moving stream of granular adsorbent, removing a second fraction of said gaseous mixture comprising the gases of lowest critical temperature from said adsorption operation as substantially unadsorbed gases, contacting the resulting absorbent with a portion of a third fraction of said gaseous mixture comprising gases of intermediate critical temperature and thereby desorbing any residual adsorbed second fraction, contacting the resulting adsorbent with a portion of a fourth fraction and thereby adsorbing said portion of said fourth fraction and desorbing said third fraction, employing a portion of said third fraction to desorb said residual second fraction as above, and stripping said absorbent to recover therefrom said fourth fraction comprising gases of higher critical temperature than said third fraction and of lower critical temperature than said first fraction.

3. A process for separating a normally gaseous mixture containing gases of different critical temperatures into fractions differing from each other by the critical temperature thereof which comprises contacting said normally gaseous mixture in an adsorbtion operation with a moving stream of granular adsorbent, removing a first fraction of said gaseous mixture comprising the gases of lowest critical temperature from said adsorption operation as substantially unadsorbed gases, contacting the resulting adsorbent with a portion of a second fraction of said gaseous mixture comprising gases of intermediate critical temperature and thereby desorbing any residual adsorbed first fraction, contacting the resulting adsorbent with a portion of a third fraction and thereby adsorbing said portion of said third fraction and desorbing said second fraction, employing a portion of said second fraction to desorb said residual first fraction as above, stripping said adsorbent to recover therefrom said third fraction comprising gases of higher critical temperature than said second fraction, fractionating the remainder of said third fraction to obtain a fourth fraction as bottoms from said fractionation comprising the gases of highest critical temperature, a fifth fraction comprising gases of somewhat lower critical temperature than said fourth fraction, and a sixth fraction as a vapor, condensing a portion of said sixth fraction, returning said condensed portion of said fractionation to serve as reflux therein and recycling the uncondensed portion of said sixth fraction to the said adsorption operation, fractionating the remainder of said second fraction to obtain a seventh fraction as bottoms rich in gases of somewhat lower critical temperature than said fifth fraction, an eighth fraction as a liquid rich in gases of somewhat lower critical temperature than said seventh fraction, and a ninth fraction as a vapor, condensing a portion of said ninth fraction, returning said condensed portion to said last named fractionation to serve as reflux therein, and recycling the uncondensed portion of said ninth fraction to said adsorption operation.

4. A process according to claim 1 wherein the granular adsorbent is charcoal.

5. A process according to claim 2 wherein the granular adsorbent is charcoal.

6. A process according to claim 3 wherein the granular adsorbent is charcoal.

7. A process for separating a normally gaseous mixture containing hydrocarbon gases of differing molecular weights into fractions differing from each other by the molecular weight thereof, which comprises separating a first fraction comprising hydrocarbons of higher molecular weight by contacting said gaseous mixture with an adsorption oil whereby said first fraction is absorbed by said oil, withdrawing the unabsorbed components of said gaseous mixture from said absorption oil, stripping said first fraction from said absorption oil, further separating said unabsorbed components of said gaseous mixture in an adsorption operation wherein said hydrocarbons are contacted with a moving stream of granular adsorbent, removing a second fraction of said gaseous mixture comprising the hydrocarbons of lowest molecular weight from said adsorption operation as substantially unadsorbed hydrocarbons, contacting the resulting adsorbent with a portion of a third fraction of said gaseous mixture comprising hydrocarbons of intermediate molecular weight and thereby desorbing any residual adsorbed second fraction, contacting the resulting adsorbent with a portion of a fourth fraction and thereby adsorbing said portion of said fourth fraction and desorbing said third fraction, employing a portion of said third fraction to desorb said residual second fraction as above, stripping said adsorbent to recover therefrom said fourth fraction comprising hydrocarbons of higher molecular weight than said third fraction, combining the remainder of said fourth fraction with said first fraction, fractionating said combined fractions to obtain a fifth fraction as bottoms from said fractionation comprising hydrocarbons of highest molecular weight, a sixth fraction as a liquid comprising hydrocarbons of somewhat lower molecular weight than said fifth fraction, and a seventh fraction as a vapor, condensing a portion of said seventh fraction, returning said condensed portion to said fractionation to serve as reflux therein, and recycling the uncondensed portion of said seventh fraction to the said adsorption operation, fractionating the remainder of said third fraction to obtain an eighth fraction as bottoms rich in hydrocarbons of somewhat lower molecular weight than said sixth fraction, a ninth fraction as a liquid rich in hydrocarbons of somewhat lower molecular weight than said eighth fraction, and a tenth fraction as a vapor, condensing a portion of said tenth fraction, returning said condensed portion to said last named fractionation to serve as reflux therein, and recycling the uncondensed portion of said tenth fraction to said adsorption operation.

8. A process for separating a normally gaseous mixture containing hydrocarbon gases of differing molecular weights into fractions differing from each other by the molecular weight thereof, which comprises separating in a separation zone a first fraction comprising hydrocarbons of higher molecular weight by contacting said gaseous mixture with an absorption oil whereby said first fraction is absorbed by said oil, withdrawing the unabsorbed components of said gaseous mixture from said absorption oil, stripping said first fraction from said absorption oil, recycling a portion of said first fraction to said zone, further separating said unabsorbed components of said gaseous mixture in an adsorption operation wherein said unadsorbed components are contacted with a moving stream of granular adsorbent, removing a second fraction of said gaseous mixture comprising the hydrocarbons of lowest molecular weight from said adsorption operation as substantially unadsorbed hydrocarbons, contacting the resulting adsorbent with a portion of a third fraction of said gaseous mixture comprising hydrocarbons of intermediate molecular weight and thereby desorbing any residual adsorbed second fraction, contacting the resulting adsorbent with a portion of a fourth fraction and thereby adsorbing said portion of said fourth fraction and desorbing said third fraction, employing a portion of said third fraction to desorb said residual second fraction as above, stripping said absorbent to recover therefrom said fourth fraction comprising hydrocarbons of higher molecular weight than said third fraction and of lower molecular weight than said first fraction.

9. A process for separating a normally gaseous mixture containing hydrocarbon gases of differing molecular weights into fractions differing from each other by the molecular weight thereof, which comprises contacting said normally gaseous mixture in an adsorption operation with a moving stream of granular adsorbent, removing a first fraction of said gaseous mixture comprising the hydrocarbons of lowest molecular weight from said adsorption operation as substantially unadsorbed hydrocarbons, contacting the resulting adsorbent with a portion of a second fraction of said gaseous mixture comprising hydrocarbons of intermediate molecular weight and thereby desorbing any residual adsorbed first fraction, contacting the resulting adsorbent with a portion of a third fraction and thereby adsorbing said portion of said third fraction and desorbing said second fraction, employing a portion of said second fraction to desorb said residual first fraction as above, stripping said adsorbent to recover therefrom said third fraction comprising hydrocarbons of higher molecular weight than said second fraction, fractionating the remainder of said third fraction to obtain a fourth fraction as bottoms from said fractionation comprising the hydrocarbons of highest molecular weight, a fifth fraction as a liquid comprising hydrocarbons of somewhat lower molecular weight than said fourth fraction, and a sixth fraction as a vapor, condensing a portion of said sixth fraction, returning said condensed portion of said sixth fraction to said fractionation to serve as reflux therein and recycling the uncondensed portion of said sixth fraction to the said adsorption operation, fractionating the remainder of said second fraction to obtain a seventh fraction as bottoms rich in hydrocarbons of somewhat lower molecular weight than said fifth fraction, an eighth fraction as a liquid rich in hydrocarbons of somewhat lower molecular weight than said seventh fraction, and a ninth fraction as a vapor condensing a portion of said ninth fraction, returning said condensed portion to said last named fractionation to serve as reflux therein, and recycling the uncondensed portion of said ninth fraction to said adsorption operation.

10. A process for separating a mixture of paraffinic and olefinic hydrocarbons containing from 1 to 4 carbon atoms into fractions enriched in one or more of said hydrocarbons which comprises separating the $C_4$ hydrocarbons from said hydrocarbon mixture in a separation zone by contacting said mixture with an absorption oil whereby said $C_4$ hydrocarbons are absorbed by said oil, withdrawing the unabsorbed hydrocarbons from said absorption oil, stripping said $C_4$ hydrocarbons from said absorption oil, causing said $C_4$ hydrocarbons to condense and recycling uncondensed hydrocarbons obtained from said stripping to said zone, further separating said unabsorbed hydrocarbons of said gaseous mixture in an adsorption operation wherein said hydrocarbon gases are contacted with a moving stream of granular adsorbent, removing a fraction rich in $C_1$ hydrocarbon from said adsorption operation as substantially unadsorbed gases, contacting the resulting adsorbent with a portion of a fraction rich in $C_2$ hydrocarbons and thereby desorbing any residual adsorbed $C_1$ hydrocarbon, contacting the resulting adsorbent with a portion of a fraction rich in $C_3$ hydrocarbons and thereby adsorbing said portion of said fraction rich in $C_3$ hydrocarbons and desorbing said fraction rich in $C_2$ hydrocarbons, employing a portion of said fraction rich in $C_2$ hydrocarbons to desorb said residual $C_1$ hydrocarbon as above, stripping said adsorbent to recover therefrom said fraction rich in $C_3$ hydrocarbons, returning a portion of said last named fraction to said adsorbent to effect said desorption of said $C_2$ hydrocarbons, combining the remainder of said $C_3$ hydrocarbons with said $C_4$ hydrocarbons, fractionating said combined hydrocarbons to obtain a fraction as bottoms from said fractionation rich in said $C_4$ hydrocarbons, a side cut fraction rich in $C_3$ hydrocarbons and a vaporous overhead fraction comprising $C_3$ and $C_2$ hydrocarbons, condensing said $C_3$ hydrocarbons from said vaporous overhead fraction, returning said condensed portion to said fractionation to serve as reflux therein and recycling the uncondensed portion of said vaporous overhead fraction to the said adsorption operation, fractionating the remainder of said fraction rich in said $C_2$ hydrocarbons to obtain a fraction rich in $C_2$ paraffin hydrocarbon as bottoms, a fraction as a liquid side cut rich in $C_2$ olefin hydrocarbon and a vaporous overhead fraction comprising $C_1$ paraffin and $C_2$ olefin hydrocarbons, condensing said $C_2$ olefin hydrocarbon from said vaporous overhead fraction, returning said condensed $C_2$ olefin hydrocarbon to said last named fractionation to serve as reflux therein and recycling the uncondensed portion of said vaporous overhead fraction to said adsorption operation.

11. A process for separating a mixture of paraffinic and olefinic hydrocarbons containing from 1 to 4 carbon atoms into fractions enriched in one or more of said hydrocarbons which comprises separating in a separation zone a fraction rich in $C_4$ hydrocarbons from said hydrocarbon mixture by contacting said mixture with an absorption oil whereby said fraction rich in $C_4$ hydrocarbons is absorbed by said oil, withdrawing the unabsorbed hydrocarbons from said absorption oil, stripping said fraction rich in $C_4$ hydrocarbons from said absorption oil, causing said $C_4$ hydrocarbons in said fraction to condense and recycling uncondensed hydrocarbons from said fraction to said zone, further separating said unabsorbed hydrocarbons of said gaseous mixture in an adsorption operation wherein said unadsorbed gases are contacted with a moving stream of granular adsorbent, removing a fraction rich in $C_1$ hydrocarbon from said adsorption operation as substantially unadsorbed gases, contacting the resulting adsorbent with a portion of a fraction rich in $C_2$ hydrocarbons and thereby desorbing any residual adsorbed $C_1$ hydrocarbon, contacting the resulting adsorbent with a portion of a fraction rich in $C_3$ hydrocarbons and thereby adsorbing said portion of said fraction rich in $C_3$ hydrocarbons and desorbing said fraction rich in $C_2$ hydrocarbons, employing a portion of said fraction rich in $C_2$ hydrocarbons to desorb said residual $C_1$ hydrocarbon as above, stripping said adsorbent to recover therefrom said fraction rich in $C_3$ hydrocarbons, returning a portion of said last named fraction to said adsorbent to effect said desorption of said $C_2$ hydrocarbons and separating the remainder of said last named fraction from said adsorbent.

12. A process for separating a mixture of paraffinic and olefinic hydrocarbons containing from 1 to 4 carbon atoms into fractions enriched in one or more of said hydrocarbons which comprises introducing said hydrocarbon mixture into an adsorption operation wherein said hydrocarbons are contacted with a moving stream of granular adsorbent, removing a fraction rich in $C_1$ hydrocarbon from said adsorption operation as substantially unadsorbed gases, contacting the resulting adsorbent with a portion of a fraction rich in $C_2$ hydrocarbons and thereby desorbing any residual adsorbed $C_1$ hydrocarbon fraction, contacting the resulting adsorbent with a portion of a fraction rich in $C_3$ and $C_4$ hydrocarbons and thereby adsorbing said portion of said fraction rich in $C_3$ and $C_4$ hydrocarbons and desorbing said fraction rich in $C_2$ hydrocarbons, employing a portion of said fraction rich in $C_2$ hydrocarbons to desorb said residual $C_1$ hydrocarbon as above, stripping said adsorbent to recover therefrom said fraction rich in $C_3$ and $C_4$ hydrocarbons, returning a portion of said last named fraction to said adsorbent to effect said desorption of said fraction rich in $C_2$ hydrocarbons, fractionating the remainder of said fraction rich in said $C_3$ and $C_4$ hydrocarbons to obtain a fraction as bottoms from said fractionation rich in said $C_4$ hydrocarbons, a side cut fraction rich in $C_3$ hydrocarbons and a vaporous overhead fraction comprising $C_3$ and $C_2$ hydrocarbons, condensing said $C_3$ hydrocarbons from said vaporous overhead fraction, returning said condensed portion of said vaporous overhead fraction to said fractionation to serve as reflux therein and recycling the uncondensed portion of said vaporous overhead fraction to the said adsorption operation, fractionating the remainder of said fraction rich in said $C_2$ hydrocarbons to obtain a fraction rich in $C_2$ paraffin hydrocarbons as bottoms, a side cut fraction rich in $C_2$ olefin hydrocarbon and a vaporous overhead fraction comprising $C_1$ paraffin and $C_2$ olefin hydrocarbons, condensing said $C_2$ olefin hydrocarbon from said vaporous overhead fraction, returning said condensed $C_2$ olefin hydrocarbon to said last named fractionation to serve as reflux therein and recycling the uncondensed portion of said vaporous overhead fraction to said adsorption operation.

13. An apparatus for separating a normally gaseous mixture containing gases of differing critical temperatures into fractions differing from each other by the critical temperature thereof which comprises an oil absorption column, an oil stripping column, a charcoal adsorption column, a primary rectification column, a secondary rectification column, means for returning a portion of the gases obtained from said oil stripping column to said oil absorption column, means in said charcoal adsorption column to separate an initial fraction of lowest critical temperature as unadsorbed gases from said gaseous mixture, a second fraction of gases of higher critical temperature than said initial fraction from said charcoal as a side cut, and a third fraction rich in gases of higher critical temperature than said second fraction as stripped components, means for combining said third fraction with a portion of said gases obtained from said stripping column, means for introducing said combined gases to said secondary distillation column, means for withdrawing a bottoms fraction from said secondary distillation column, means for withdrawing a liquid side cut fraction from said secondary distillation column, means for withdrawing vaporous overhead fraction from said last named column, means for condensing a portion of said vaporous overhead fraction, means for returning said condensed portion of said vaporous overhead to said secondary distillation column, means for recycling the uncondensed portion of said vaporous overhead to said charcoal adsorption column, means for introducing said second fraction of said gaseous mixture obtained from said charcoal adsorption column into said primary distillation column, means for removing a bottoms fraction from said primary distillation column, means for removing a liquid side cut fraction from said primary distillation column, means for removing a vaporous overhead fraction from said primary distillation column, means for condensing a portion of said vaporous overhead fraction, means for returning said condensed portion of said vaporous overhead to said primary distillation column, and means for returning the uncondensed portion of said vaporous overhead to said charcoal adsorption column.

14. An apparatus for separating a normally gaseous mixture containing gases of differing critical temperatures into fractions differing from each other by the critical temperature thereof which comprises an oil absorption column, an oil stripping column, a charcoal adsorption column, means for returning a portion of the gases obtained from said oil stripping column to said oil absorption column, means for conveying the unabsorbed gases from said oil absorption column to said charcoal adsorption column, means in said charcoal adsorption column to separate continuously an initial fraction of lowest critical temperature as unadsorbed gases from said gaseous mixture, a second fraction of gases of higher critical temperature than said initial fraction from said charcoal as a side cut, and means for separating a third fraction rich in gases of higher critical temperature than said second fraction as stripped components.

15. An apparatus for separating a normally gaseous mixture containing gases of differing critical temperature into fractions differing from each other by the critical temperature thereof which comprises a charcoal adsorption column, a primary rectification column, a secondary rectification column, means in said charcoal adsorption column to separate an initial fraction of lowest critical temperature as unadsorbed gases from said gaseous mixture, means for desorbing a second fraction of gases of higher critical temperature than said initial fraction from said charcoal as a side cut, means for stripping a third fraction rich in gases of higher critical temperature than said second fraction from said adsorbent, means for introducing said third fraction to said secondary distillation column, means for withdrawing a bottoms fraction from said secondary distillation column, means for withdrawing a liquid side cut fraction from said secondary distillation column, means for withdrawing vaporous overhead fraction from said last named column, means for condensing a portion of said vaporous overhead fraction, means for returning said condensed portion of said vaporous overhead to said secondary distillation column, means for recycling the uncondensed portion of said vaporous overhead to said charcoal adsorption column, means for introducing said second fraction of said gaseous mixture obtained from said charcoal adsorption column into said primary distillation column, means for removing a bottoms fraction from said distillation column, means for removing a liquid side cut fraction from said primary distillation column, means for removing a vaporous overhead fraction from said primary distillation column, means for condensing a portion of said vaporous overhead fraction, means for returning said condensed portion of said vaporous overhead to said primary distillation column, and means for returning the uncondensed portion of said vaporous overhead to said charcoal adsorption column.

16. A process for separating a normally gaseous mixture into fractions differing from each other in their relative adsorbability on a solid adsorbent which comprises separating a first fraction comprising gases of higher degree of absorbability by contacting said gaseous mixture with an absorption oil whereby said first fraction is absorbed by said oil, separating the unabsorbed components of said gaseous mixture from said absorption oil, stripping said first fraction from said absorption oil, further separating said unabsorbed components of said gaseous mixture in an adsorption operation wherein said gases are contacted with a moving stream of granular adsorbent, removing a second fraction of said gaseous mixture comprising gases of lowest adsorbability from said adsorption operation as substantially unadsorbed gases, contacting the resulting adsorbent with a portion of a third fraction of said gaseous mixture comprising gases of intermediate adsorbability and thereby desorbing any residual adsorbed second fraction, contacting the resulting adsorbent with a portion of a fourth fraction and thereby adsorbing said portion of said fourth fraction, and desorbing said third fraction, stripping said adsorbent to recover therefrom said fourth fraction comprising gases of higher adsorbability than said third fraction, combining the remainder of said fourth fraction with said first fraction, fractionating said combined fractions to obtain a fifth fraction as bottoms from said fractionation comprising gases of highest adsorbability and a sixth fraction comprising gases of somewhat lower adsorbability, and fractionating the remainder of said third fraction to obtain a seventh fraction as bottoms rich in gases of somewhat lower adsorbability than said sixth fraction and an eighth fraction rich in gases of somewhat lower adsorbability than said seventh fraction.

17. A process for recovering ethylene from a mixture of paraffinic and olefinic hydrocarbons containing from 1 to 4 carbon atoms which comprises separating a fraction rich in $C_4$ hydrocarbons from said mixture by contacting said mixture with an absorption oil whereby said fraction rich in $C_4$ hydrocarbons is absorbed in said oil, separating the unabsorbed hydrocarbons from the said absorption oil, stripping said fraction rich in $C_4$ hydrocarbons from said absorption oil, further separating said unabsorbed hydrocarbons of said mixture in an adsorption operation wherein said unadsorbed gases are contacted with a moving stream of activated charcoal, removing a fraction rich in methane from said adsorption operation as substantially unadsorbed gases, contacting the resulting charcoal with a portion of a fraction rich in $C_2$ hydrocarbons and thereby desorbing any residual adsorbed fraction rich in methane, contacting the resulting charcoal with a portion of a fraction rich in $C_3$ hydrocarbons and thereby adsorbing the said portion of said fraction rich in $C_3$ hydrocarbons and desorbing said fraction rich in $C_2$ hydrocarbons, stripping said charcoal to recover therefrom said fraction rich in $C_3$ hydrocarbons, returning a portion of said last named fraction to said charcoal to effect said desorption of said fraction rich in $C_2$ hydrocarbons, withdrawing the remainder of said last named fraction from said charcoal, and fractionally distilling it to obtain a fraction rich in ethylene.

18. A process for separating a normally gaseous mixture into fractions differing from each other in their relative adsorbability on a solid adsorbent which comprises separating a first fraction comprising gases of highest degree of adsorbability which are not readily desorbable from said solid adsorbent, further separating the residual gaseous mixture by contacting said gases with a solid adsorbent so as to obtain second, third and fourth fractions of said gaseous mixture of successively greater degrees of adsorbability, combining said fourth fraction with said first fraction, fractionating said combined fractions to obtain a fifth fraction comprising gases of highest adsorbability and a sixth fraction comprising gases of somewhat lower adsorbability, and fractionating said third fraction to obtain a seventh fraction rich in gases of somewhat lower adsorbability than said sixth fraction and an eighth fraction rich in gases of somewhat lower adsorbability than said seventh fraction.

19. A process for recovering ethylene from a gaseous mixture containing ethylene in admixture with hydrocarbons containing one to four carbon atoms, which comprises separating a fraction rich in $C_4$ hydrocarbons from said mixture, separating the remaining gases by contact with activated charcoal so as to obtain a fraction rich in methane, another fraction rich in $C_2$ hydrocarbons and another fraction rich in $C_3$ hydrocarbons, combining said fraction rich in $C_4$ hydrocarbons with said fraction rich in $C_3$ hydrocarbons and fractionating the combined mixture to separate therefrom any remaining $C_2$ hydrocarbons, which are returned to the charcoal adsorption step, and fractionating said $C_2$ hydrocarbon fraction from said charcoal adsorption step to obtain a fraction rich in ethylene.

20. A process for separating a normally gaseous mixture into fractions differing from each other in their relative adsorbability on a solid adsorbent, which comprises separating a first fraction comprising gases of highest degree of adsorbability, contacting the remaining gaseous mixture with said solid adsorbent, removing a second fraction of said gaseous mixture comprising gases of lowest adsorbability as substantially unadsorbed gases, contacting the resulting adsorbent with a portion of a third fraction of said gaseous mixture comprising gases of somewhat higher degree of adsorbability and thereby adsorbing said portion of said third fraction and desorbing any residual second fraction therefrom, contacting the resulting adsorbent with a portion of a fourth fraction of still higher degree of adsorbability and thereby adsorbing said portion of said fourth fraction and desorbing said third fraction, employing a portion of said third fraction to desorb said residual second fraction as above and withdrawing the remainder of said third portion, stripping said adsorbent to recover therefrom said fourth fraction, employing a portion of said fourth fraction for desorbing said third fraction as above, and withdrawing the remainder of said fourth fraction.

21. A process for recovering ethylene from a gaseous mixture containing ethylene in admixture with hydrocarbons containing from one to four carbon atoms, which comprises separating a fraction rich in $C_4$ hydrocarbons from said gaseous mixture, contacting the remaining gases with activated charcoal, removing a fraction rich in methane from said charcoal as substantially unadsorbed gas, contacting the resulting charcoal with a portion of a fraction rich in $C_2$ hydrocarbons and thereby adsorbing the said portion of said fraction rich in $C_2$ hydrocarbons and desorbing any residual fraction rich in methane therefrom, contacting the resulting charcoal with a portion of a fraction rich in $C_3$ hydrocarbons and thereby adsorbing the said portion of said fraction rich in $C_3$ hydrocarbons and desorbing said fraction rich in $C_2$ hydrocarbons, employing a portion of said fraction rich in $C_2$ hydrocarbons to desorb said residual fraction rich in methane as above, withdrawing the remainder of said fraction rich in $C_2$ hydrocarbons, stripping the resulting charcoal to recover therefrom said fraction rich in $C_3$ hydrocarbons, returning a portion of said fraction rich in $C_3$ hydrocarbons to desorb said fraction rich in $C_2$ hydrocarbons as above, and withdrawing the remainder of said fraction rich in $C_3$ hydrocarbons.

22. A process for separating a normally gaseous mixture into fractions differing from each other in their relative adsorbability on a solid adsorbent which comprises separating therefrom a first fraction comprising gases of highest degree of adsorbability by contacting said gaseous mixture with an absorption oil in an absorption system, withdrawing the unabsorbed components of said gaseous mixture from said absorption oil, stripping said absorbed material from said absorption oil, condensing a portion of the so stripped gases, withdrawing the condensed portion, returning the uncondensed portion of said stripped gases to said oil absorption system, and contacting the withdrawn unabsorbed components of said gaseous mixture with a solid adsorbent so as to adsorb therefrom an additional fraction comprising gases of higher degree of adsorbability while leaving an unadsorbed fraction of lower degree of adsorbability.

23. A process for recovering ethylene from a gaseous mixture containing said ethylene in admixture with hydrocarbons containing from one to four carbon atoms, which comprises contacting said mixture with an absorption oil in an absorption system whereby a fraction rich in $C_4$ hydrocarbons is absorbed in said oil, stripping said fraction rich in $C_4$ hydrocarbons from said absorption oil, condensing a portion of said stripped fraction and returning the uncondensed portion to said absorption system, withdrawing the unabsorbed gases from said absorption oil and contacting said unabsorbed gases with activated charcoal so as to separate therefrom a fraction rich in ethylene.

24. An apparatus for separating a normally gaseous mixture into fractions differing from each other in their relative adsorbability on a solid adsorbent which comprises an oil absorption column, an oil stripping column, a settling drum, a charcoal adsorption column, means for absorbing a portion of said gaseous mixture in said oil absorption column, means for stripping the adsorbed gases in said stripping column, means for transferring the gases from said stripping column to said settling drum, means for liquefying a portion of said gases, means for returning the non-liquefied portion to said oil absorption column, means for transferring the unabsorbed gases from said oil absorption column to said charcoal adsorption column, and means for separating said gases in said charcoal adsorption column to obtain fractions of different degrees of adsorbability therefrom.

25. A process for separating a normally gaseous mixture into fractions differing from each other in their relative adsorbability on a solid adsorbent which comprises contacting said gaseous mixture with said solid adsorbent, removing therefrom a first fraction comprising gases of lowest adsorbability as substantially unadsorbed gases, contacting the resulting adsorbent with a portion of a second fraction of higher degree of adsorbability so as to adsorb said portion of said second fraction and desorb any residual adsorbed gases of lowest degree of adsorbability, contacting the resulting adsorbent with a portion of a third fraction of highest degree of adsorbability and thereby adsorbing said portion of said third fraction and desorbing said second fraction, employing a portion of said second fraction to desorb said residual first fraction as above, withdrawing the remainder of said second fraction, stripping said third fraction from the resulting adsorbent, employing a portion of said stripped third fraction to desorb said second fraction as above, and withdrawing the remainder of said third fraction.

26. An apparatus for the separation of a gaseous mixture by selective adsorption on a solid adsorbent which comprises a column having a cooling section near the top thereof, a stripping section near the bottom thereof, and an intermediate adsorption section, means for passing said adsorbent continuously downward through said sections of said column, means for removing said adsorbent from the bottom of said column and conveying it to the top of said column, means for introducing said gaseous mixture into the lower portion of said adsorption section, means for removing lean gas from the upper portion of said adsorption section, means for introducing a stripping gas into the lower portion of said stripping section, means for removing said stripping gas and rich gas from the upper portion of said stripping section and means for indirectly cooling said adsorbent in said cooling section.

CLYDE H. O. BERG.

REFERENCES CITED

The following references are of record in the file of this patent:

UNITED STATES PATENTS

| Number | Name | Date |
|---|---|---|
| 1,422,008 | Soddy | July 4, 1922 |
| 2,325,577 | Balcar | July 27, 1943 |